US010680474B2

United States Patent
Gajanayake

(10) Patent No.: US 10,680,474 B2
(45) Date of Patent: Jun. 9, 2020

(54) PERMANENT MAGNET ELECTRICAL MACHINE

(71) Applicant: ROLLS-ROYCE plc, London (GB)

(72) Inventor: Chandana J. Gajanayake, Singapore (SG)

(73) Assignee: Rolls-Royce plc (GB)

( * ) Notice: Subject to any disclaimer, the term of this patent is extended or adjusted under 35 U.S.C. 154(b) by 122 days.

(21) Appl. No.: 16/150,337

(22) Filed: Oct. 3, 2018

(65) Prior Publication Data

US 2019/0140495 A1    May 9, 2019

(30) Foreign Application Priority Data

Nov. 8, 2017  (GB) .................................. 1718452.4

(51) Int. Cl.
*H02K 21/02* (2006.01)
*H02K 11/25* (2016.01)
(Continued)

(52) U.S. Cl.
CPC .............. *H02K 1/27* (2013.01); *F01D 15/10* (2013.01); *H02K 1/223* (2013.01); *H02K 7/1823* (2013.01);
(Continued)

(58) Field of Classification Search
CPC ...... H02K 1/223; H02K 11/25; H02K 7/1823; H02K 21/028; H02K 1/12; H02K 1/17;
(Continued)

(56) References Cited

U.S. PATENT DOCUMENTS

| 5,015,905 A * | 5/1991 | Koharagi | H02K 23/46 |
| | | | 310/186 |
| 6,265,801 B1 * | 7/2001 | Hashiba | H02K 1/165 |
| | | | 310/156.28 |

(Continued)

FOREIGN PATENT DOCUMENTS

| DE | 4421594 | 1/1996 |
| EP | 2479885 A1 | 7/2012 |
| EP | 2608371 | 6/2013 |
| EP | 2479885 B1 | 10/2013 |
| EP | 3035504 | 6/2016 |

OTHER PUBLICATIONS

Great Britain Search Report dated May 3, 2018, issued in GB Patent Application No. 1718452.4.
(Continued)

*Primary Examiner* — Mohamad A Musleh
(74) *Attorney, Agent, or Firm* — Barnes & Thornburg LLP

(57) ABSTRACT

A permanent magnet electrical machine has a rotor supporting a circumferential row of permanent magnets. The electrical machine further has a stator coaxial with the rotor and having a circumferential row of stator teeth carrying respective coils. The teeth provide paths for magnetic flux produced by the magnets, thereby electromagnetically linking the magnets and the coils when the rotor rotates relative to the stator. The teeth have respective core portions on which the coils are mounted, and respective tip portions located between the core portions and the rotor, neighbouring tip portions being circumferentially spaced from each other by respective gaps. Each pair of neighbouring tip portions has a bridge member and a thermal switching mechanism carried by a first tip portion of the pair.

11 Claims, 3 Drawing Sheets

(51) Int. Cl.
  *H02K 1/22* (2006.01)
  *H02K 1/27* (2006.01)
  *F01D 15/10* (2006.01)
  *H02K 7/18* (2006.01)
  *H02K 1/12* (2006.01)
  *H02K 1/17* (2006.01)
  *H02K 3/493* (2006.01)
  *H02K 15/03* (2006.01)

(52) U.S. Cl.
  CPC ............ *H02K 11/25* (2016.01); *H02K 21/028* (2013.01); *H02K 1/12* (2013.01); *H02K 1/17* (2013.01); *H02K 3/493* (2013.01); *H02K 15/03* (2013.01); *H02K 2213/06* (2013.01)

(58) Field of Classification Search
  CPC .......... H02K 1/27; H02K 3/493; H02K 15/03; H02K 2213/06; F01D 15/10
  See application file for complete search history.

(56) References Cited

U.S. PATENT DOCUMENTS

| | | |
|---|---|---|
| 6,313,560 B1 | 11/2001 | Dooley |
| 7,605,503 B2 | 10/2009 | El-Rafai et al. |
| 7,605,504 B2 | 10/2009 | El-Rafaie et al. |
| 2004/0251765 A1 | 12/2004 | Dooley et al. |

OTHER PUBLICATIONS

Nipp, "Permanent Magnet Motor Drives with Switched Stator Windings," Royal Institute of Technology Department of Electric Power Engineering Electrical Machines and Drives, 1999.

Extended EP Search Report dated on Dec. 21, 2018 and issued in connection with EP Patent Appln. No. 18199667.9.

* cited by examiner

PERMANENT MAGNET ELECTRICAL MACHINE

CROSS-REFERENCE TO RELATED APPLICATIONS

This application is based upon and claims the benefit of priority from British Patent Application No. GB 1718452.4 filed on Nov. 8, 2017, the entire contents of which are incorporated herein by reference.

BACKGROUND

Technical Field

The present disclosure relates to a permanent magnet electrical machine.

Description of Related Art

Permanent magnet (PM) electrical machines can provide very high power and torque densities and are thus attractive options for a number of aerospace power generation and motor (e.g. pumping and actuation) applications. However, especially in generation applications, the permanency of the excitation provided by the permanent magnets can be a drawback. In particular, in some circumstances it may be necessary to turn off the excitation, notably under conditions in which the machine has a hazardous fault (e.g. a turn-to-turn electrical short-circuit within a coil). One option would be to turn off the power source driving the generator, but evidently this may not be realistic when that power source is a main engine.

Thus to address the problem other solutions have been proposed, including adoption of so-called fault-tolerant machine design, in which the machine is designed to be able to operate safely with a sub-set of possible fault scenarios. However, as such designs may not be capable of accommodating faults outside the sub-set, they offer at best only a partial solution. Further solutions include incorporation of a mechanical disconnect mechanism in the drive-train to the generator. This removes the mechanical input to the generator, but typically adds cost, weight and complexity.

SUMMARY

The electrical machine of the present disclosure addresses the problem in a different manner, namely by diverting magnetic flux away from stator core regions that link with stator coils in the event of a detected fault, and thereby removing the induced voltage in the stator coils which are the source of damaging short-circuit currents.

Accordingly, in a first aspect, the present disclosure provides a permanent magnet electrical machine having:

a rotor supporting a circumferential row of permanent magnets;

a stator coaxial with the rotor and having a circumferential row of stator teeth carrying respective coils, the teeth providing paths for magnetic flux produced by the magnets, thereby electromagnetically linking the magnets and the coils when the rotor rotates relative to the stator;

wherein the teeth have respective core portions on which the coils are mounted, and respective tip portions located between the core portions and the rotor, neighbouring tip portions being circumferentially spaced from each other by respective gaps; and wherein each pair of neighbouring tip portions has a bridge member and a thermal switching mechanism carried by a first tip portion of the pair, the bridge member and the thermal switching mechanism being configured such that, when the temperature of the first tip portion exceeds a threshold temperature, the thermal switching mechanism moves the bridge member from a retracted position in which it is retracted to the first tip portion to a deployed position in which it bridges the gap between the first tip portion and the second tip portion of the pair, thereby forming a shortcut bypassing the respective coil for magnetic flux linking the pair of neighbouring tip portions.

The bridge member and the thermal switching mechanism can have a minimal impact on electromagnetic performance, and do not necessarily increase the overall volume or mass of the electrical machine. Moreover, by acting in response to abnormal temperature increases, they can be automatic and fast acting with almost immediate elimination of fault currents, and no mechanical interaction with the spinning rotor is required. In addition, they allow the machine to isolate any faulty coils, while continuing partial operations with its remaining unfaulty coils.

The electrical machine may operate as a generator and/or as a motor. In a second aspect, the present disclosure provides a gas turbine engine having an electrical machine according to the first aspect. For example, the machine may operate as a generator powered by the gas turbine engine (e.g. by taking off power from a shaft of the engine), or as a motor powering an engine system (e.g. a fuel pump of the engine fuel system, an oil pump of the engine oil system, an actuator adjusting variable geometry components of the engine, or a fan in the case of hybrid or electric propulsion systems).

Further optional features of the present disclosure will now be set out. These are applicable singly or in any combination with any aspect of the present disclosure.

At least 80% of the magnetic flux linking the pair of neighbouring tip portions may use the shortcut to bypass the respective coil when the bridge member is in its deployed position. Preferably, at least 90% or 95% of the magnetic flux linking the pair of neighbouring tip portions may use the shortcut.

Each pair of neighbouring tip portions may further have a detent mechanism which arrests the bridge member in the deployed position. Thus even in the event of a failure of the thermal switching mechanism, the bridge member can be safely maintained in the deployed position. The detent mechanism can also help to reduce or eliminate vibration of the bridge member.

The thermal switching mechanism may conveniently include a bimetallic switch or a shape memory alloy switch.

The thermal switching mechanism may include a pre-loaded spring which is released by a switch part of the thermal switching mechanism (e.g. the aforementioned bimetallic switch or shape memory alloy switch) to urge the bridge member to the deployed position. Such an arrangement can also accommodate an override device which can release the pre-loaded spring independently of the state of the switch part. For example, the override device may be controlled by a pick-up coil arranged to detect short circuit conditions in the coil e.g. by means of harmonic components in the coil current, whereby when the pick-up coil detects short circuit conditions, the override device releases the pre-loaded spring.

Conveniently, the bridge member may be housed in a first recess in the first tip portion in the retracted position.

Conveniently the bridge member may be received into a second recess in the second tip portion in the deployed position.

Each tip portion may carry a respective bridge member and a respective thermal switching mechanism.

The skilled person will appreciate that except where mutually exclusive, a feature described in relation to any one of the above aspects may be applied mutatis mutandis to any other aspect. Furthermore except where mutually exclusive any feature described herein may be either or both of applied to any aspect and combined with any other feature described herein.

DESCRIPTION OF THE DRAWINGS

Embodiments of the present disclosure will now be described by way of example with reference to the accompanying drawings in which.

DESCRIPTION OF THE DISCLOSURE

Figure 1:
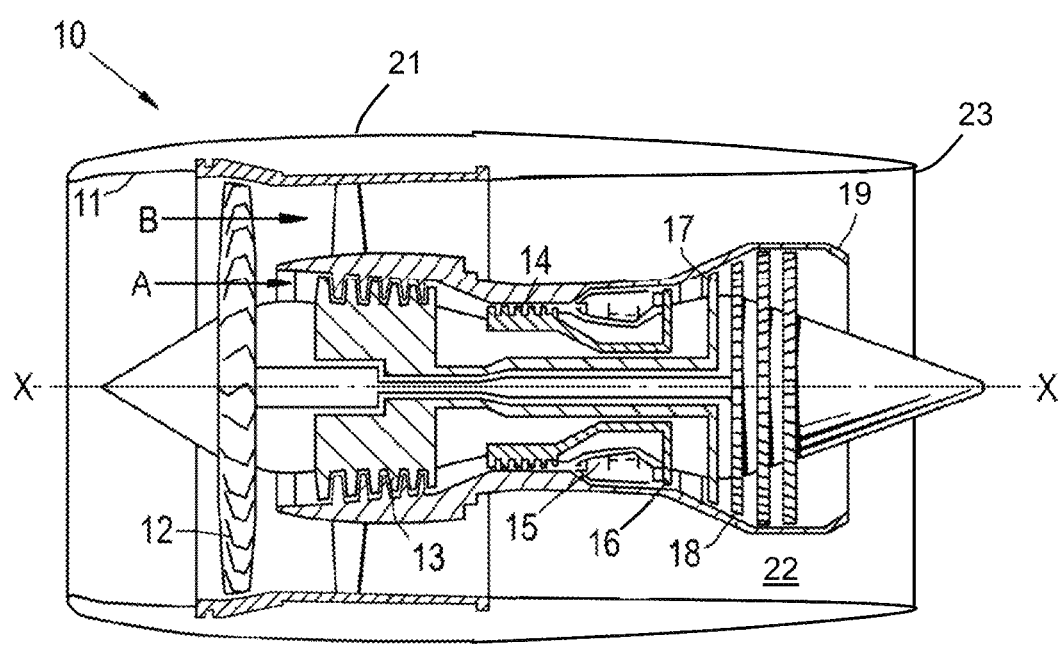
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine has one or more permanent magnet electrical machines. For example, the electrical machine may operate as a generator powered by one of the above-mentioned interconnecting shafts, or as a motor powering e.g. a pump of the engine's fuel or oil system, an actuator(s) which adjust variable vanes of the engine, or the engine fan in hybrid or electric propulsion systems. The permanent magnet electrical machines may be embedded in the gas turbine engine, e.g. as disclosed in EP A 3035504, hereby incorporated by reference).

Figure 2:
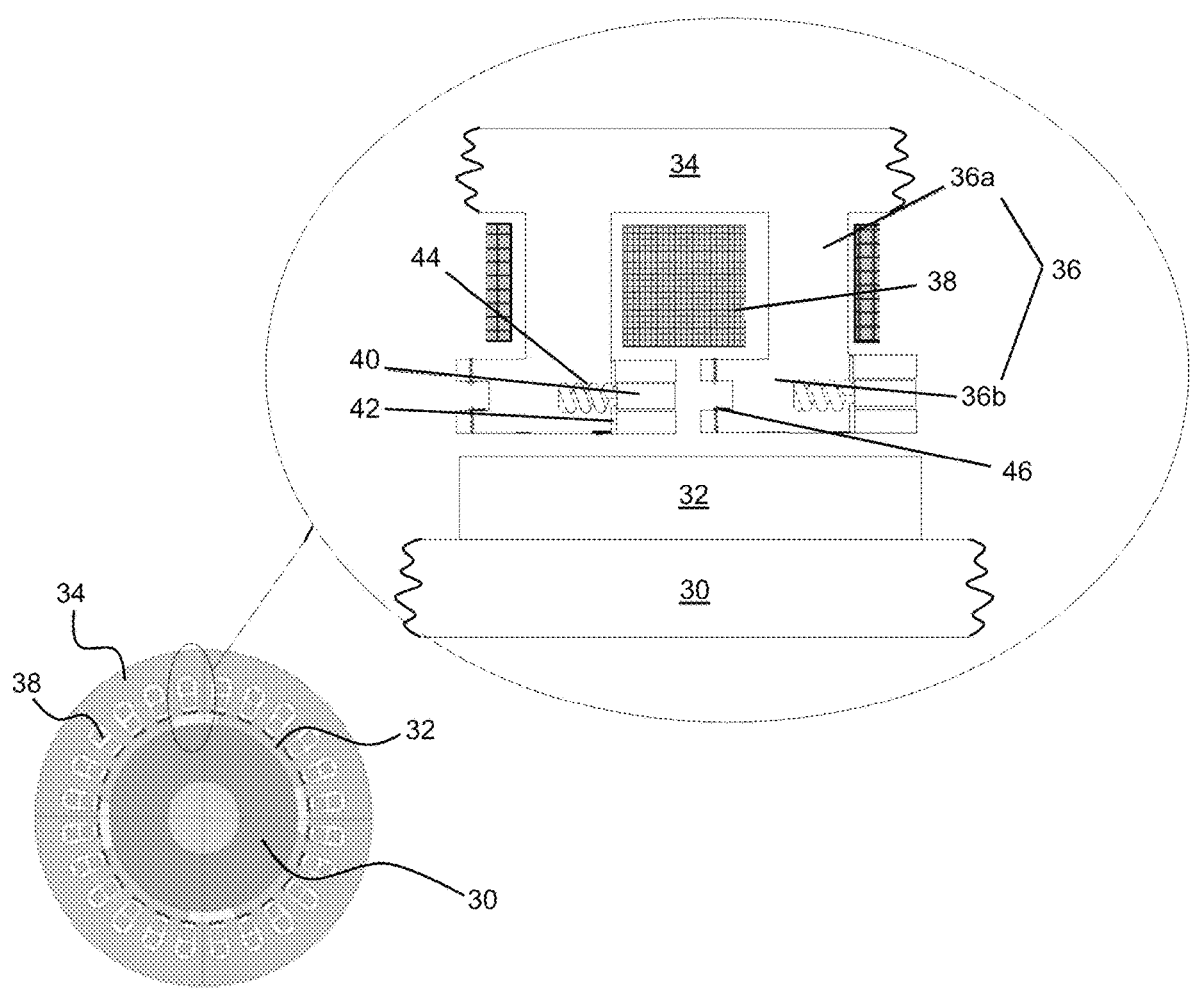
FIG. 2 shows schematically at bottom left a transverse cross-section through a permanent magnet electrical machine, and at top right a detailed view of two neighbouring stator teeth of the machine.

An example of the permanent magnet electrical machine is shown schematically in transverse cross-section at bottom left in FIG. 2. The machine has an inner rotor 30 supporting a circumferential row of permanent magnets 32 (four as shown in FIG. 2). It also has a coaxial outer stator (or "back iron") 34 which provides a circumferential row of stator teeth 36 (twenty four as shown in FIG. 2) around which are wound coils 38. The teeth providing paths for magnetic flux produced by the magnets, thereby electromagnetically linking the magnets and the coils when the rotor rotates relative to the stator. The electrical machine shown in FIG. 2 is a surface permanent magnet machine, but the present disclosure applies equally to an interior permanent magnet machine.

As shown in more detail at top right in FIG. 2, each stator tooth 36 is formed from a core portion 36a, and a tip portion 36b radially inwards from the core portion. The coils 38 are wound around core portions such that substantially all of the space in the slot between neighbouring core portions is occupied by the windings of the coils. The tip portion of each tooth extends circumferentially partly across the slots to both sides of the tooth in a "T" shape, but leaves gaps which space neighbouring tip portion circumferentially from each other. The gaps are large enough to prevent leakage flux across the gaps in normal operation.

A first one of each pair of neighbouring tip portions 36b has a bridge member 40. This has a retracted position (shown in FIG. 2) in which the bridge member is housed in a recess formed in the first tip portion, and a deployed position in which the bridge member projects from the recess to be received in an opposing recess formed in the second one of the pair of neighbouring tip portions, thereby bridging the two tip portions.

The movement of the bridge member 40 from the retracted to the deployed position is controlled by a thermal switching mechanism. This mechanism typically includes a bimetallic or shape memory alloy switch 42 and a compression spring 44. The spring is pre-loaded to urge the bridge member from the retracted to the deployed position, but under normal operating conditions is prevented from acting on the bridge member by the switch.

However, if a fault occurs in a coil 38, such as a turn-to-turn or coil-to-coil short circuit due to insulation breakdown, a large circulating current appears in the shorted part due to the continual feeding of magnetic flux into the stator 34 from the rotor magnets 32. As a result, the local temperature of the stator increases. When the temperature exceeds a threshold, the switch 42 automatically activates, releasing the spring 44, which in turn rapidly urges the bridge member to the deployed position.

Figure 3:
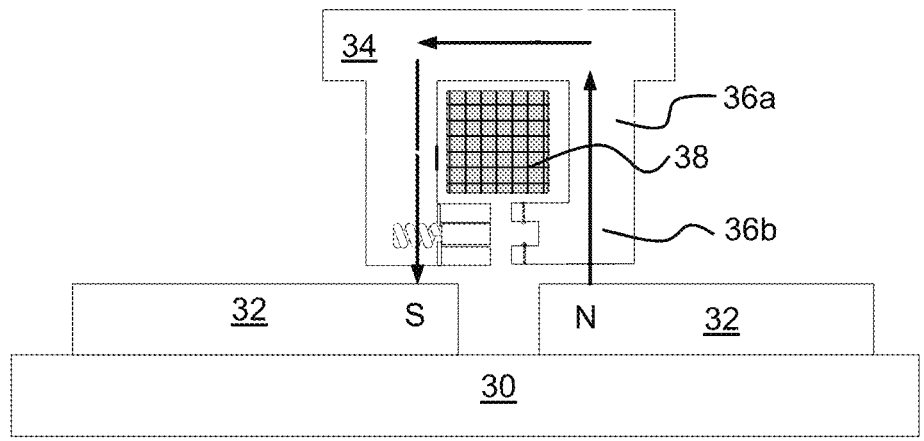
FIG. 3 shows schematically the two neighbouring stator teeth under normal operating conditions.

FIG. 3 shows again a detailed transverse cross-section similar to that shown at top right of FIG. 2, but with N and S poles of the rotor magnet 32 respectively aligned with the neighbouring stator teeth 36 and with arrows indicating the predominant path for magnetic flux through the stator 34. In FIG. 3, the bridge member 40 is in the retracted position.

Figure 4:
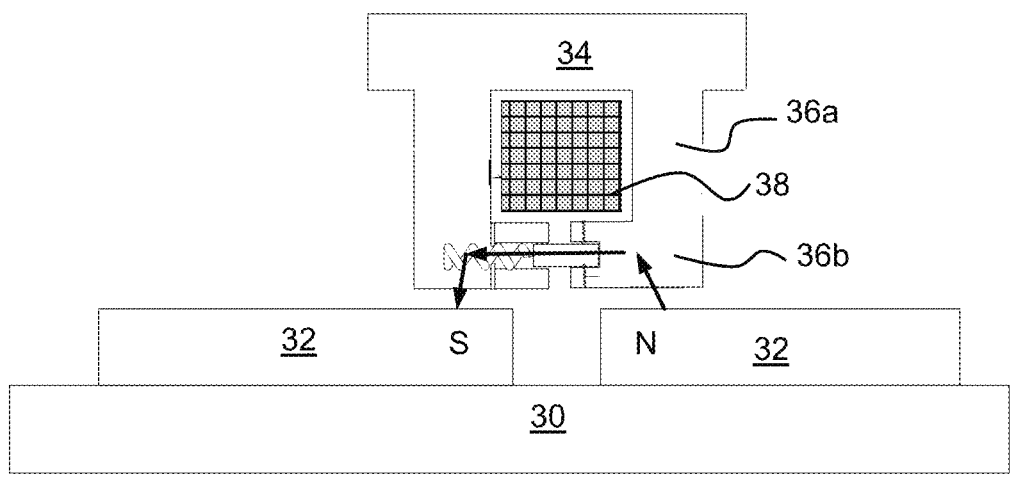
FIG. 4 shows the two neighbouring stator teeth under a fault condition in which a magnetic flux shortcut is produced.

By contrast, FIG. 4 shows again the same cross-section as FIG. 3, but now with the bridge member 40 in the deployed position in which it forms a shortcut bypassing the respective coil 38 for magnetic flux linking the neighbouring tip portions 36b. At least 80%, and preferably at least 90% or 95%, of the flux that would otherwise pass through the coil can be diverted in this way.

Thus the bridging of the gap between neighbouring tip portions 36b with the magnetic flux conducting bridge member 40 results in a magnetic short circuit of the rotor magnet 32 in just that particular locality, i.e. substantially reducing the induced voltage in the coil windings located in the inter-teeth slot which opens to the gap.

If the winding fault involves coils/windings in a number of slots, the respective thermal switching mechanisms and bridge members 40 can magnetically short circuit just those affected slots, thereby isolating the affected zones while allowing healthy coils to continue to generate electrical power. For example if 10% of a phase is affected due to a fault condition the proposed approach would isolate only the affected slots and the remaining 90% of the coils 38 located in other slots would continue to generate voltage. In this way, the machine would able to operate with reduced voltage generation capability rather than having to shut down completely.

Optionally, as shown in FIG. 2, the receiving recess for the deployed bridge member 40 can include a detent mechanism 46 that prevents return of the bridge member to the retracted position e.g. in the event of a failure of the spring 44. The detent mechanism can also help to prevent vibration of the bridge member.

The thermal switching mechanism can accommodate an override device which can release the pre-loaded spring 44 independently of the state of the switch 42. For example, such an override device may be controlled by a pick-up coil arranged to detect short circuit conditions in the coil 38 by means of harmonic components in the coil current, whereby when the pick-up coil detects short circuit conditions, the override device releases the spring.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A permanent magnet electrical machine having:
   a rotor supporting a circumferential row of permanent magnets;
   a stator coaxial with the rotor and having a circumferential row of stator teeth carrying respective coils, the teeth providing paths for magnetic flux produced by the magnets, thereby electromagnetically linking the magnets and the coils when the rotor rotates relative to the stator;
   wherein the teeth have respective core portions on which the coils are mounted, and respective tip portions located between the core portions and the rotor, neighbouring tip portions being circumferentially spaced from each other by respective gaps; and
   wherein each pair of neighbouring tip portions has a bridge member and a thermal switching mechanism carried by a first tip portion of the pair, the bridge member and the thermal switching mechanism being configured such that, when the temperature of the first tip portion exceeds a threshold temperature, the thermal switching mechanism moves the bridge member from a retracted position in which it is retracted to the first tip portion to a deployed position in which it bridges the gap between the first tip portion and the second tip portion of the pair, thereby forming a shortcut bypassing the respective coil for magnetic flux linking the pair of neighbouring tip portions.

2. The electrical machine as claimed in claim 1, wherein at least 80% of the magnetic flux linking the pair of neighbouring tip portions uses the shortcut to bypass the respective coil when the bridge member is in its deployed position.

3. The electrical machine as claimed in claim 1, wherein each pair of neighbouring tip portions further has a detent mechanism which arrests the bridge member in the deployed position.

4. The electrical machine as claimed in claim 1, wherein the thermal switching mechanism includes a bimetallic switch or a shape memory alloy switch.

5. The electrical machine as claimed in claim 1, wherein the thermal switching mechanism includes a pre-loaded spring which is released by a switch part of the thermal switching mechanism to urge the bridge member to the deployed position.

6. The electrical machine as claimed in claim 5, wherein each pair of neighbouring tip portions further has an override device which is operable to release the pre-loaded spring independently of the state of the switch part.

7. The electrical machine as claimed in claim 6, wherein each pair of neighbouring tip portions further has a pick-up coil arranged to detect short circuit conditions in the respective coil, and to control the override device to release the pre-loaded spring when such short circuit conditions are detected.

8. The electrical machine as claimed in claim 1, wherein the bridge member is housed in a first recess in the first tip portion in the retracted position.

9. The electrical machine as claimed in claim 1, wherein the bridge member is received into a second recess in the second tip portion in the deployed position.

10. The electrical machine as claimed in claim 1, wherein each tip portion carries a respective bridge member and a respective thermal switching mechanism.

11. A gas turbine engine comprising an electrical machine as claimed in claim 1.

* * * * *